United States Patent [19]

Hoag

[11] Patent Number: 4,698,551
[45] Date of Patent: Oct. 6, 1987

[54] DISCHARGE ELECTRODE FOR A GAS DISCHARGE DEVICE

[75] Inventor: Ethan D. Hoag, Boston, Mass.

[73] Assignee: Laser Corporation of America, Lowell, Mass.

[21] Appl. No.: 841,767

[22] Filed: Mar. 20, 1986

[51] Int. Cl.⁴ .................... H01J 17/04; H01S 3/09
[52] U.S. Cl. ............................ 313/619; 313/631; 372/87
[58] Field of Search ............ 313/619, 631, 632, 248, 313/267, 268; 372/87

[56] References Cited

U.S. PATENT DOCUMENTS 4,320,322  3/1982  Rothwell, Jr. et al. ........ 313/349 X
4,342,115  7/1982  Davis .................................. 372/87

FOREIGN PATENT DOCUMENTS 908488  3/1960  United Kingdom ............... 313/619

Primary Examiner—David K. Moore
Assistant Examiner—Sandra L. O'Shea

[57] ABSTRACT

A discharge electrode for a gas discharge device has pin-shaped electrodes which are effectively cooled in the gas flow and which promote a stable glow-discharge. The pin-shaped electrodes are made from a wire member which is curled at its end. An extension portion of the electrodes extends a predetermined length from the curled end, and is bent in an approximately L-shape to form a post position. The pin-shaped electrode is disposed in the gas flow so that the extension portion is orthogonal to the gas flow.

1 Claim, 5 Drawing Figures

DISCHARGE ELECTRODE FOR A GAS DISCHARGE DEVICE

BACKGROUND OF THE INVENTION

This invention relates to a construction of a discharge electrode using pin-shaped electrodes, and more particularly, to a discharge electrode for gas discharge device in which said pin-shaped electrodes are effectively cooled in a gas flow and in which a stable glow discharge can be accomplished in the gas flow.

In the prior art, a known discharge electrode having pin-shaped electrodes is used in various gas discharge devices. For instance, in one form of this pin-shaped electrode, a predetermined length of a wire member is bent approximately into an L shape, one side of the L shape (post portion) being set upright on an insulating base plate and the other side (extension portion) being allowed to accomplish a required electric discharge.

However, in case such kind of pin-shaped electrode is used, for instance, on a 3-axis orthogonal type laser oscilating apparatus, the following problems occur.
(1) Since the end of the extension portion has such a form that is made merely by shearing a wire member, a local electric discharge occurs at this end, and thus it is difficult to allow a stable glow discharge.
(2) Also, when the extension portion is allowed to coincide with the direction of the gas flow, the gas which has been heated by the base portion of the extension portion will flow towards to end thereof, and thus the cooling of the pin-shaped electrode will become insufficient.

SUMMARY OF THE INVENTION

An object of the invention is to provide an discharge electrode for gas discharge device in which pin-shaped electrodes can be effectively cooled in the gas flow and in which a stable glow discharge can be accomplished in the gas flow.

In order to accomplish the above object, in this invention, the end of a wire member is curled to an approximately circular shape to form a curled portion, an extension portion is formed with a predetermined length from said curled portion, a post portion is formed with a predetermined length by bending the base portion of the extension portion approximately to an L shape, and then, a pin-shaped electrode consisting of said curled portion, said extension portion and said post portion is disposed in a gas flow so that said extension portion is orthogonal to the gas flow.

DETAILED DESCRIPTION OF THE PREFERRED EMBODIMENT

Figure 1:
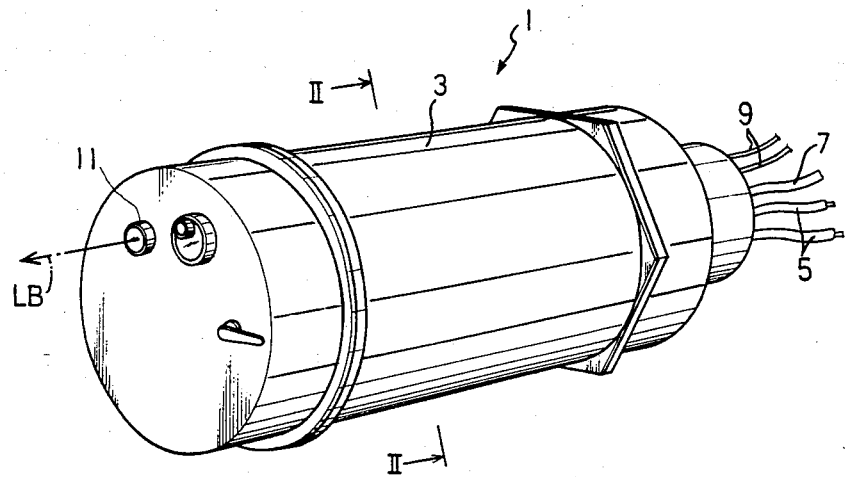
FIG. 1 is a perspective view of a laser oscilating apparatus in which this invention is embodied.
Figure 2:
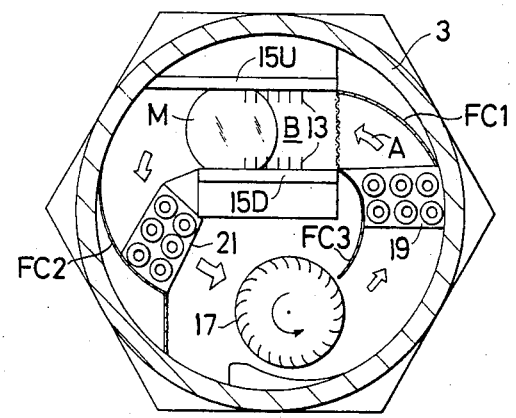
FIG. 2 is a cross-sectional view taken along the line II—II in FIG. 1.

FIG. 1 and FIG. 2 show a 3-axis orthogonal type laser oscillating apparatus in which this invention has been embodied.

As shown in FIG. 1, a laser oscillating apparatus 1 is constructed so as to enclose a laser resonator in a gastight laser housing 3. At the right end of the housing 3, there are connected electrical source cables 5, gas injecting tube 7 for injecting mixed gas which is a lasing medium, and cooling water piping 9 for interior cooling. At the left end of the housing 3, there is formed a laser output window 11.

As shown in FIG. 2, at the upper portion of the inside of the housing 3, there is provided an upper and lower pair of discharge electrodes 15U, 15D along the longitudinal direction of the housing 3 spaced vertically apart at a predetermined distance apart vertically, each said discharge electrode having a large number of pin-shaped electrodes. Below the lower discharge electrode 15D, there is provided a blower 17 which rotates in a counter-clockwise direction as seen in the drawing and which produces a gas flow A in the housing 3.

Heat exchangers 19, 21 are provided between the blower 17 and an electric discharge space B formed by discharge electrodes 15U, 15D. Flow directing baffles FC1, FC2, FC3 for producing a smooth gas flow A are suitably provided between blower 17, heat exchangers 19, 21 and discharge electrodes 15U, 15D. Also a pair of folding mirrors M are disposed opposite to one another at the inside of the both ends of the housing 3, the electric discharge space B being imterposed therebetween.

Figure 3:
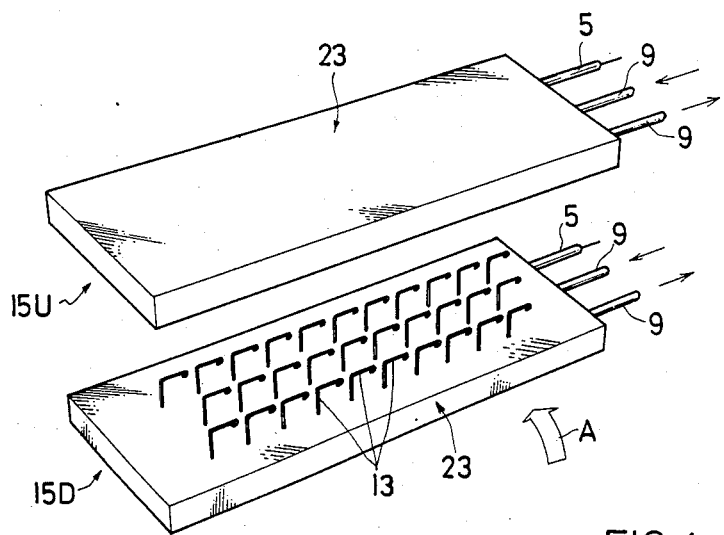
FIG. 3 is a perspective view of an discharge electrode showing an embodiment of this invention.
Figure 4:
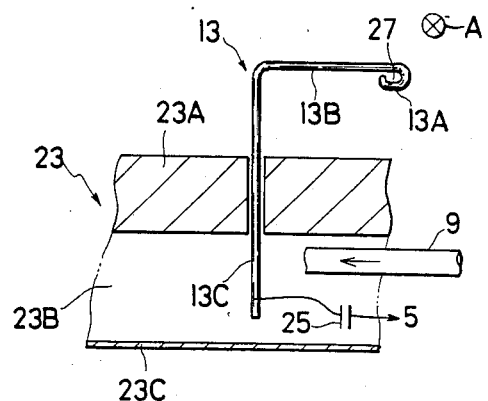
FIG. 4 is an illustrative cross-sectional view which has been enlarged to show the construction of a pin-shaped electrode.

As shown in FIG. 3 and FIG. 4, discharge electrodes 15U, 15D are provided with a large number of pin-shaped electrodes which are arranged in a staggered manner. The pin-shaped electrode 13 is constructed as follows. An end of a wire member is curled to an approximately circular shape forming a curled portion 13A, a predetermined length of an extension portion 13B is made from said curled portion 13A, and then the base portion of said extension portion 13B is bent to an L shape so as to form a predetermined length of a post portion 13C. The pin shaped electrode 13 is embedded in a base plate 23 so that the extension portion 13B is orthogonal to the direction of the gas flow A. The base plate 23 is constructed of a ceramic insulating base plate 23A, a molded portion 23B, and a copper shield plate 23C.

The post portion 13C of the pin-shaped electrode 13 penetrates the insulating base plate 23A, and the rear end thereof is connected to a ballast capacitor 25 at the inside of the molded portion 23B. The capacitor 25 is connected to said electrical source cable 5. Cooling water piping 9 extends into the inside of the molded portion 23B. The cooling water piping 9 is disposed in a manner such that it is close to the insulating base plate and thus prevents the insulating base plate 23A from thermal deformation, especially from warping.

Figure 5:
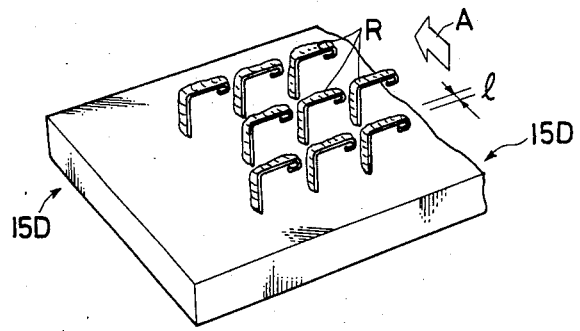
FIG. 5 is an illustrative perspective view showing, in enlarged form, a portion of the discharge electrode shown in the lower part of FIG. 3.

As shown in FIG. 5, the pin-shaped electrode 13 receives the gas flow A, and thus a turbulence R with a length l will occur in the gas flow A.

At this time, since the extension portion 13B of the pin-shaped electrode 13 is orthogonal to the gas flow A, the length l of the turbulence will be considerably short, or almost zero.

In the meantime, in the case when the gas is directed to the pin-shaped electrode from the left side in FIG. 4, a turbulence length l will be a function of the length of the extension portion and also a function of a cavity 27 made by the curled portion 13A, and thus it becomes, l>>1. Of course, also in this example the Reynold's number, given by, $$Re = \rho \cdot U \cdot a / \mu$$

where $\mu$ is viscosity, a is characteristic length, $\rho$ is gas density and U is gas velocity, must be below a predetermined value, for instance, 50.

Accordingly, with the pin-shaped electrode 13 as shown in the embodiment, the turbulence length l becomes considerably short, and thus it becomes possible to arrange the successive pin-shaped electrodes close to each other.

Also, in the pin-shaped electrode 13 as shown in the embodiment, since the curled portion 13A, the extension portion 13B, and the post portion 13C are all disposed orthogonal to the direction of the gas flow A, the pin-shaped electrode 13 will be cooled uniformly by the gas flow A. In the meantime, in the case when the extension portion 13A of the pin-shaped electrode 13 is disposed along the direction of the gas flow, the gas which has been heated by the base portion of the extension portion 13B will flow towards the end of the extension portion, and thus the cooling of the extension portion 13B and the curled portion will be insufficient.

Further, in the discharge electrode as shown in this embodiment, with a staggered arrangement of the pin-shaped electrodes, it becomes possible to accomplish a homogeneous electric discharge by the whole surface of the base plate.

As above, the pin-shaped electrode 13 is sufficiently cooled and also there will be no long turbulence produced. With the staggered arrangement of the pin-shaped electrodes, the discharge electrodes 15U, 15D will be able to accomplish an electric discharge which is homogeneous as well as stable.

What is claimed is:

1. A discharge electrode for a gas discharge device of the type in which a plurality of pin-shaped electrodes are disposed in a gas flow, comprising:
   a. a base plate comprised of a molded portion sandwiched between a ceramic insulating portion and a copper shield plate;
   b. a ballast capacitor disposed within the molded portion of said base plate;
   c. electrical cable means for connecting said ballast capacitor to an electrical source disposed externally of said base plate;
   d. cooling means disposed within the molded portion of said base plate near the ceramic insulating portion of said base plate for cooling the ceramic insulating portion of said base plate to prevent thermal deformation thereof; and
   e. a plurality of pin-shaped electrodes arranged in a multiplicity of staggered rows, each pin shaped electrode of said plurality of pin shaped electrodes comprising a curled portion, an extension portion, and a post portion, said curled portion being formed by curling an end of a wire member in an approximately circular shape, said extension portion being formed by a predetermined length of said wire member extending from said curled portion, said post portion being formed with a predetermined length of said wire member by bending the base portion of said extension portion into an approximately L shape, said post portion of each electrode penetrating the insulating portion of said base plate and being connected within the molded portion of said base plate to said ballast capacitor, and said extension portion being disposed in the gas flow so as to lie transverse to the direction of the gas flow.

* * * * *